(12) United States Patent
Chen et al.

(10) Patent No.: US 11,512,984 B2
(45) Date of Patent: Nov. 29, 2022

(54) DYNAMIC DISPLACEMENT ERROR COMPENSATION SYSTEM

(71) Applicant: HIWIN MIKROSYSTEM CORP., Taichung (TW)

(72) Inventors: Kai-Ti Chen, Taichung (TW); Chun-Yi Yi, Taichung (TW); Wei-Te Chuang, Taichung (TW); Yen-Yu Chen, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 103 days.

(21) Appl. No.: 17/210,237

(22) Filed: Mar. 23, 2021

(65) Prior Publication Data

US 2022/0307869 A1  Sep. 29, 2022

(51) Int. Cl.
*G01D 5/244* (2006.01)
*G06F 9/4401* (2018.01)

(52) U.S. Cl.
CPC ....... *G01D 5/24476* (2013.01); *G06F 9/4411* (2013.01)

(58) Field of Classification Search
CPC .......................... G01D 5/24476; G06F 9/4411
See application file for complete search history.

(56) References Cited

U.S. PATENT DOCUMENTS

2019/0337106 A1\* 11/2019 Nakamura ............. B23Q 1/623

FOREIGN PATENT DOCUMENTS

| JP | S62226206 | 10/1987 |
| JP | H0740163 | 2/1995 |
| JP | 2007142093 | 6/2007 |

\* cited by examiner

*Primary Examiner* — Gustavo Polo
(74) *Attorney, Agent, or Firm* — Guice Patents PLLC

(57) ABSTRACT

A dynamic displacement error compensation system by which detection error information obtained based on calibration detection of first and second axes, is respectively made into first and second compensation tables for compensating displacement on the axes by using positional information of the axes as variables, the first compensation table is stored in a first driver of a first motor device for driving a first moving element to move linearly on the first axis, the second compensation table is stored in a second driver of a second motor device for driving a second moving element to move linearly on the second axis, the drivers simultaneously or successively obtain a first dynamic positional information of the first moving element on the first axis and a second dynamic positional information of the second moving element on the second axis, and the moving elements are respectively displaceably compensated according to the compensation tables.

5 Claims, 4 Drawing Sheets

DYNAMIC DISPLACEMENT ERROR COMPENSATION SYSTEM

BACKGROUND OF THE INVENTION

Field of Invention

The invention is related to positioning calibration technology of motors, and more particularly to a dynamic displacement error compensation system.

Related Art

In the technical field where motors are used as displacement driving components, limited machining precision affects the accuracy of displacement positions. In modem industries where precision is becoming more and more important, a slight position error may lead to major product defects. In order to ensure the accuracy of displacement position, a number of prior technologies have been disclosed in the prior art. For example, in the Chinese Patent Publication No. 104076739A, it is disclosed that a laser interferometer is used to measure the displacement stroke of a linear motor in order to know the deviation degree at each specific position of the linear motor in its displacement stroke, and based thereon to establish an error compensation table of the linear motor, and then use the error compensation table as the basis of position calibration for the linear motor in use, thereby improving the accuracy of displacement position.

However, the technology disclosed in the above-mentioned Chinese Patent Publication No. 104076739A can only compensate and calibrate the position of a single-axis movement, and cannot compensate and calibrate the position coupling error of a dual-axes motion on a plane, and thus its application is still limited. Therefore, there is another Chinese Patent Publication No. 109709892A that provides a spatial position compensation technology for multi-axes linkage. After collecting the positional information of each axis movement, calculations are further performed through the spatial position compensation program in a computer to correct the feedback position signal of a position sensing element, and the corrected feedback position signal is fed back to a drive system to compensate based on the corrected feedback positional information. Although the above-mentioned Chinese Patent Publication No. 109709892A can be used for dynamic compensation, it requires an additional external computer device with high computing power to be able to perform calculations and correction compensation, and the cost is expensive.

SUMMARY OF THE INVENTION

Therefore, a main object of the invention is to provide a dynamic displacement error compensation system capable of achieving error compensation for two- dimensional motion or motion of more than two dimensions without being required to set up additional devices in a drive framework, which is economical and accurate.

In order to achieve the above-mentioned object, a main technical feature of a dynamic displacement error compensation system provided by the invention is that detection error information obtained based on calibration detection of a first axis and a second axis, is respectively made into a first compensation table for compensating displacement on the first axis and a second compensation table for compensating displacement on the second axis by using positional information of the first axis and the second axis as variables, and the first compensation table is stored in a first driver of a first motor device for driving a first moving element to move linearly on the first axis, and the second compensation table is stored in a second driver of a second motor device for driving a second moving element to move linearly on the second axis, and the first driver and the second driver simultaneously or successively obtain a first dynamic positional information of the first moving element on the first axis and a second dynamic positional information of the second moving element on the second axis, and then the first moving element and the second moving element are respectively displaceably compensated according to the first compensation table and the second compensation table.

Thereby, the dynamic displacement error compensation system is capable of performing dynamic displacement error compensation by using the first driver and the second driver without being required to set up additional computing devices for computing compensation. In addition to being able to reduce costs, compensation of displacement error can also be achieved for two different axial directions or more than two different axial directions.

Further, in order to enable the dynamic displacement error compensation system to be applied to the existing technology without hindrance, the dynamic displacement error compensation system can further comprise a communication unit. The communication unit is electrically connected to the first driver and the second driver, so that the first dynamic positional information obtained by the first driver can be transmitted to the second driver via the communication unit, similarly, the second dynamic positional information obtained by the second driver can also be transmitted to the first driver via the communication unit, thereby the first dynamic positional information and the second dynamic positional information obtained by the first driver and the second driver can be used to compensate motional displacement on the first axis and the second axis according to the first compensation table and the second compensation table respectively.

BRIEF DESCRIPTION OF THE DRAWINGS

The objects, features, and achieved efficacies of the invention can be understood from the description and drawings of the following preferred embodiments, in which.

DETAILED DESCRIPTION OF THE INVENTION

Figure 1:
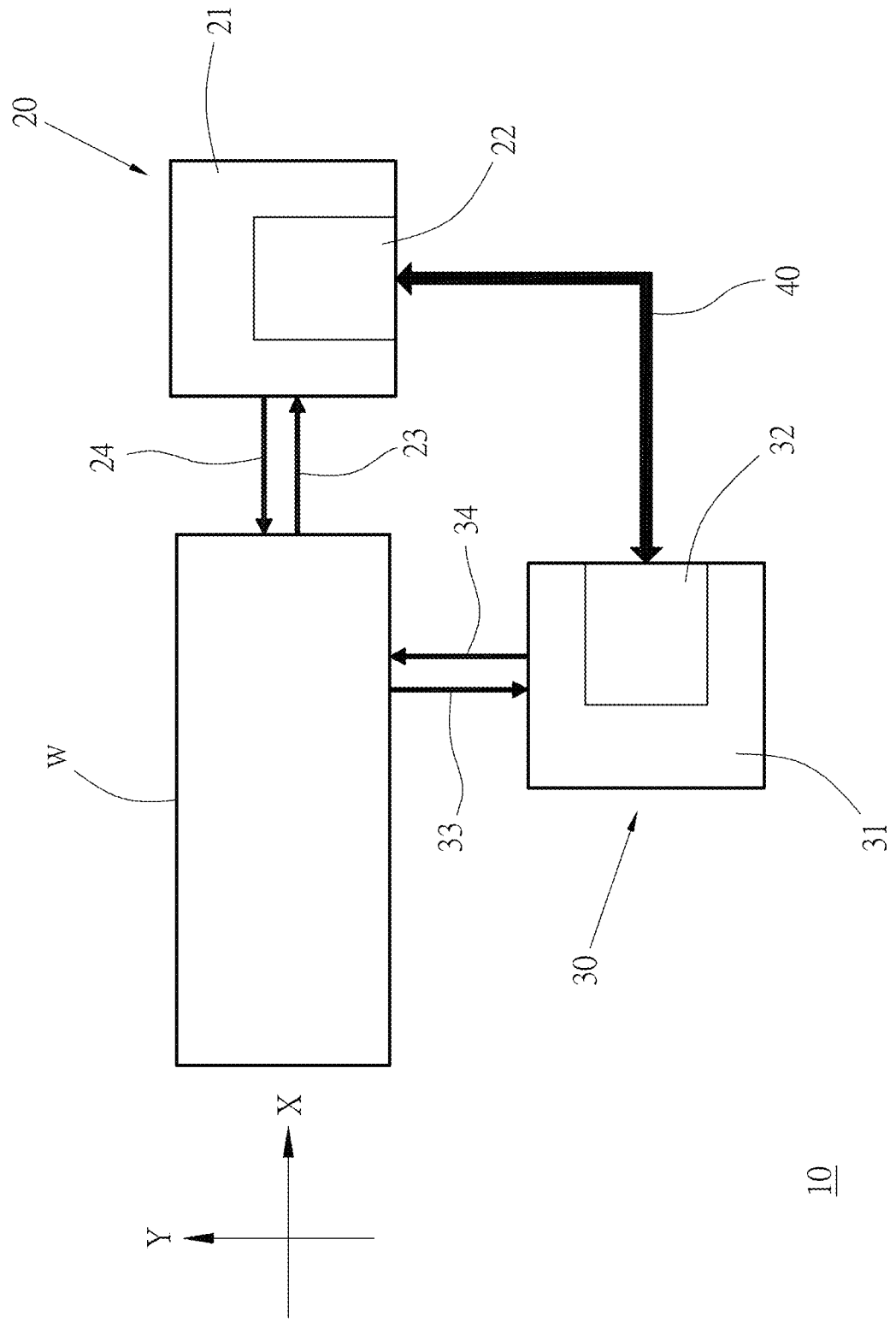
FIG. 1 is a schematic diagram of a preferred embodiment of the invention.

First of all, please refer to FIG. 1 for a dynamic displacement error compensation system 10 provided in a preferred embodiment of the invention mainly comprising a first motor device 20 and a second motor device 30, a first moving element driven by the first motor device 20 to displace linearly reciprocatively along a first axis X direction, and a second moving element driven by the second motor device 30 to displace linearly reciprocatively along a second axis Y direction. As shown in FIG. 1, the directions of the first axis X and the second axis Y are perpendicular to each other, and working strokes of the first moving element and the second moving element define a working plane W. However, the above-disclosed technique is not a technical subject matter intended to be improved through the invention, and it is a known prior art for those having ordinary skill in the art in the technical field to which the invention pertains, so the present invention will only explain the parts related to the technical features of the invention based on the parts essentially required to understand the technical features of the invention.

Wherein the first motor device 20 is a linear motor, and is provided with a stator extending along the first axis X direction, and a rotor as the first moving element that moves in the first axis X direction. Similarly, the second motor device 30 is also a linear motor, and is provided with a stator extending along the second axis Y direction, and a rotor as the second moving element that moves in the second axis Y direction. In addition, position sensing technique such as optical ruler, magnetic ruler or other position sensing techniques used to obtain dynamic positional information of the first moving element and the second moving element, are also well-known technical contents, and are known to those having ordinary skill in the art in the technical field to which the invention pertains.

The features of the dynamic displacement error compensation system 10 which are different from the above-mentioned prior art lie in the ware and the method. Among them, as for the ware, a first driver 21 of the first motor device 20 is provided with a first dynamic error processing unit 22, and a second driver 31 of the second motor device 30 is provided with a second dynamic error processing unit 32. And a communication unit 40 is electrically connected to the first driver 21 and the second driver 31, so that the first driver 21 and the second driver 31 are capable of communicating with each other via the communication unit 40.

Figure 2:
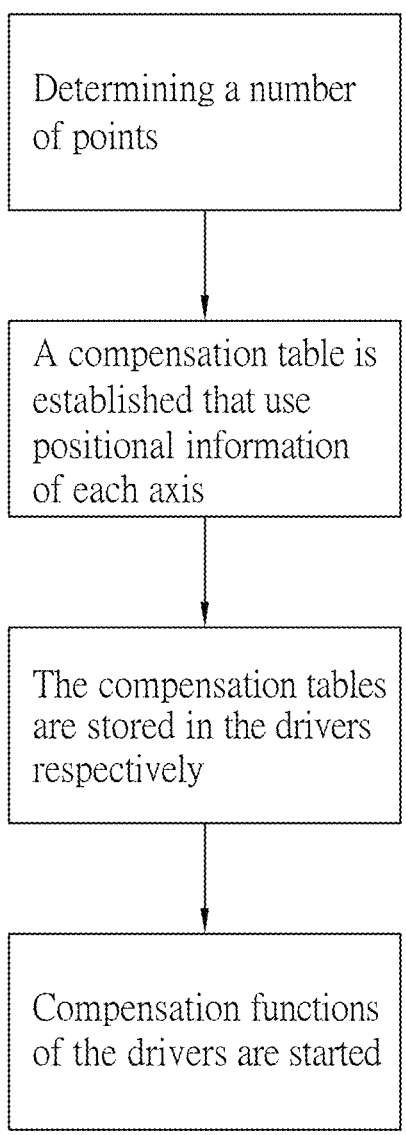
FIG. 2 is a flow chart of establishing a detection error compensation table in a preferred embodiment of the invention.

As for the method, as shown in FIG. 2, displacements of the first moving element and the second moving element on the first axis X and the second axis Y respectively are detected to obtain error values, and after determining a number of points compensated on a plane based on the error values, a first compensation table and a second compensation table are established that use positional information of the first axis X and positional information of the second axis Y as variables which are applicable for compensating the first axis X as shown in Table 1, and applicable for compensating the second axis Y as shown in Table 2 respectively, and then the first compensation table is stored in the first driver 21, the second compensation table is stored in the second driver 31, and compensation functions of the first driver 21 and the second driver 31 are started.

Figure 3:
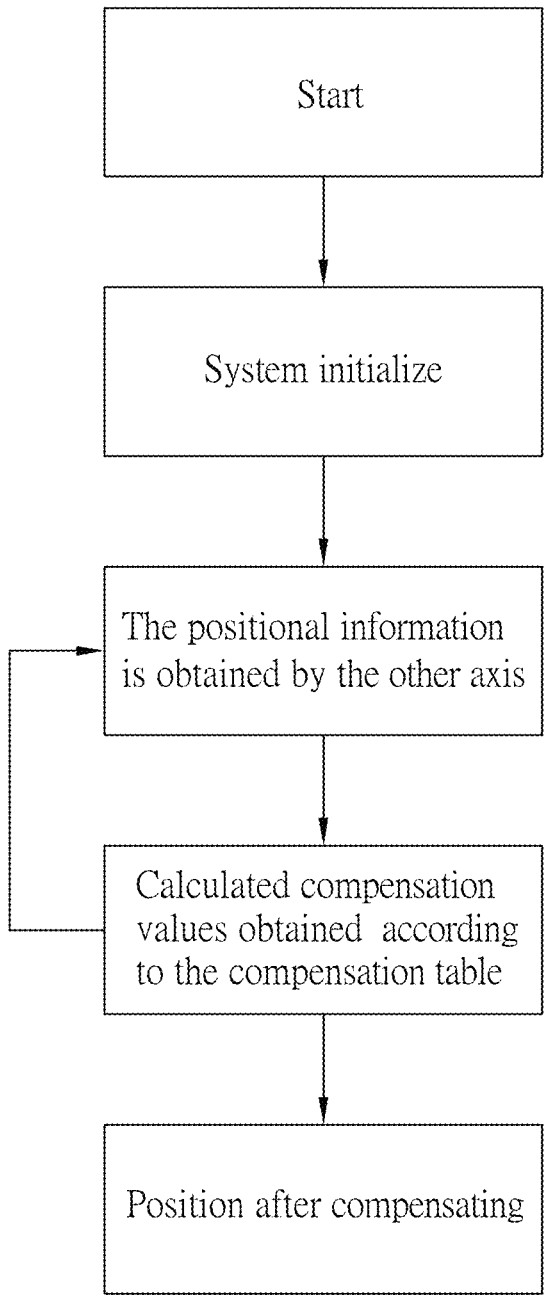
FIG. 3 is a flowchart of performing dynamic error compensation in a preferred embodiment of the invention.

Please continue to refer to FIGS. 1 and 3, after the dynamic displacement error compensation system 10 is initialized, by using conventional position sensing technique, a first dynamic positional information 23 of the first moving element moving on the first axis X is fed back to the first driver 21, and a second dynamic positional information 33 of the second moving element moving on the second axis Y is fed back to the second driver 31, and at the same time, the second dynamic positional information 33 is obtained by the first driver 21 from the second driver 31 via the communication unit 40, and the first dynamic positional information 23 is obtained by the second driver 31 from the first driver 21 via the communication unit 40. Thereby, based on the obtained first dynamic positional information 23 and second dynamic positional information 33, and calculated compensation values obtained corresponding to and according to the first compensation table and the second compensation table respectively, the first dynamic error processing unit 22 and the second dynamic error processing unit 32 are capable of dynamically compensating displacements for the first moving element and the second moving element through control signals 24, 34. For example: when the first dynamic positional information 23 corresponds to a position at 120 mm of the first axis X, and the second dynamic positional information corresponds to a position at 90 mm of the second axis Y; according to the first compensation table as Table 1 , a compensation value should be given to dynamic displacement of the first moving element by the first driver 21 is −0.85 mm;

TABLE 1 the first compensation table

| | | Position on the first axis (unit mm) | | | | | | | | | | |
|---|---|---|---|---|---|---|---|---|---|---|---|---|
| | | 0 | 30 | 60 | 90 | 120 | 150 | 180 | 210 | 240 | 270 | 300 |
| Position on the second axis (unit mm) | 0 | 3.38 | −3.75 | −4.80 | −3.17 | −1.84 | 2.50 | −3.57 | 4.65 | −0.47 | 3.37 | −3.17 |
| | 30 | 1.26 | 4.24 | 1.14 | 4.06 | 1.36 | 3.72 | −3.07 | −4.35 | 1.79 | 3.84 | −2.49 |
| | 60 | 2.32 | 0.59 | 3.69 | −2.31 | −4.46 | 0.43 | 3.70 | −3.79 | −1.18 | −2.57 | −3.67 |
| | 90 | 1.86 | 0.41 | 3.89 | 2.35 | −0.85 | −0.74 | −2.63 | −3.93 | −2.33 | −4.64 | 3.94 |
| | 120 | −1.95 | −0.09 | 3.97 | 0.34 | 4.33 | 2.14 | −1.59 | 1.54 | 2.43 | −2.61 | 4.42 |
| | 150 | −4.06 | −0.10 | −4.45 | 3.32 | −3.79 | −1.73 | 2.44 | −0.82 | 1.90 | 2.16 | −0.60 |
| | 180 | 1.61 | −1.95 | −2.48 | −4.60 | −3.93 | 2.94 | 1.52 | −3.30 | −2.90 | −2.03 | 3.96 |
| | 210 | 0.73 | 2.37 | 3.13 | 0.76 | 3.03 | 1.94 | 3.25 | −0.73 | −1.91 | −2.09 | 0.24 |
| | 240 | 1.37 | 2.92 | 2.73 | −0.20 | −3.53 | 3.46 | 4.00 | −2.06 | −0.04 | 2.69 | −3.73 |
| | 270 | −1.51 | 4.75 | 0.32 | −2.55 | 4.60 | 0.73 | −3.03 | 3.53 | −1.79 | 4.15 | 1.70 |
| | 300 | 0.49 | −1.39 | 2.98 | 0.91 | 3.09 | −0.86 | 4.91 | 3.19 | 0.98 | −2.48 | −2.30 |

Compensation value (unit um)

and according to the second compensation table as Table 2, a compensation value should be given to dynamic displacement of the second moving element by the second driver 31 is −0.82 mm

TABLE 2 the second compensation table

| | | \multicolumn{11}{c}{Position on the first axis (unit mm)} |
|---|---|---|---|---|---|---|---|---|---|---|---|---|
| | | 0 | 30 | 60 | 90 | 120 | 150 | 180 | 210 | 240 | 270 | 300 |
| Position on the second axis (unit mm) | 0 | −4.87 | −0.53 | −2.17 | −0.01 | −0.78 | −3.79 | 2.42 | −3.43 | −0.23 | 1.57 | −2.26 |
| | 30 | −3.85 | 3.17 | −1.54 | −1.08 | −4.47 | 3.97 | −1.76 | 0.67 | −0.90 | 1.69 | 4.14 |
| | 60 | −0.27 | −4.24 | 3.94 | 2.67 | −4.52 | −1.01 | −4.77 | 3.93 | −4.66 | 4.19 | −1.29 |
| | 90 | −2.93 | −2.92 | −3.04 | 0.98 | −0.82 | −0.69 | 2.44 | 2.85 | −4.80 | 1.61 | 1.89 |
| | 120 | −4.65 | 0.93 | −4.55 | −3.88 | −2.39 | −4.09 | 1.69 | 2.18 | 4.00 | −1.73 | 4.32 |
| | 150 | 1.50 | 0.75 | 0.43 | −1.82 | 2.08 | 3.53 | 0.14 | −4.33 | −0.13 | −4.81 | 2.78 |
| | 180 | 4.77 | −1.20 | 1.96 | 2.71 | −1.66 | −3.19 | 3.64 | 2.81 | −4.58 | 4.78 | 1.90 |
| | 210 | 4.79 | 2.65 | −0.05 | 2.57 | 3.98 | 2.81 | −4.40 | 2.04 | −2.61 | 2.65 | −4.63 |
| | 240 | 4.24 | −0.27 | −1.56 | −2.97 | −2.19 | −4.10 | 2.16 | −4.93 | 3.56 | 1.80 | −1.68 |
| | 270 | 4.77 | −1.09 | 0.71 | −1.11 | 4.08 | −1.58 | 1.21 | 2.44 | −2.22 | 1.75 | 2.43 |
| | 300 | 4.81 | −2.88 | 3.73 | −0.99 | −0.81 | 4.12 | 4.31 | 0.96 | −2.00 | −2.30 | 1.63 |

Compensation value (unit um)

Figure 4:
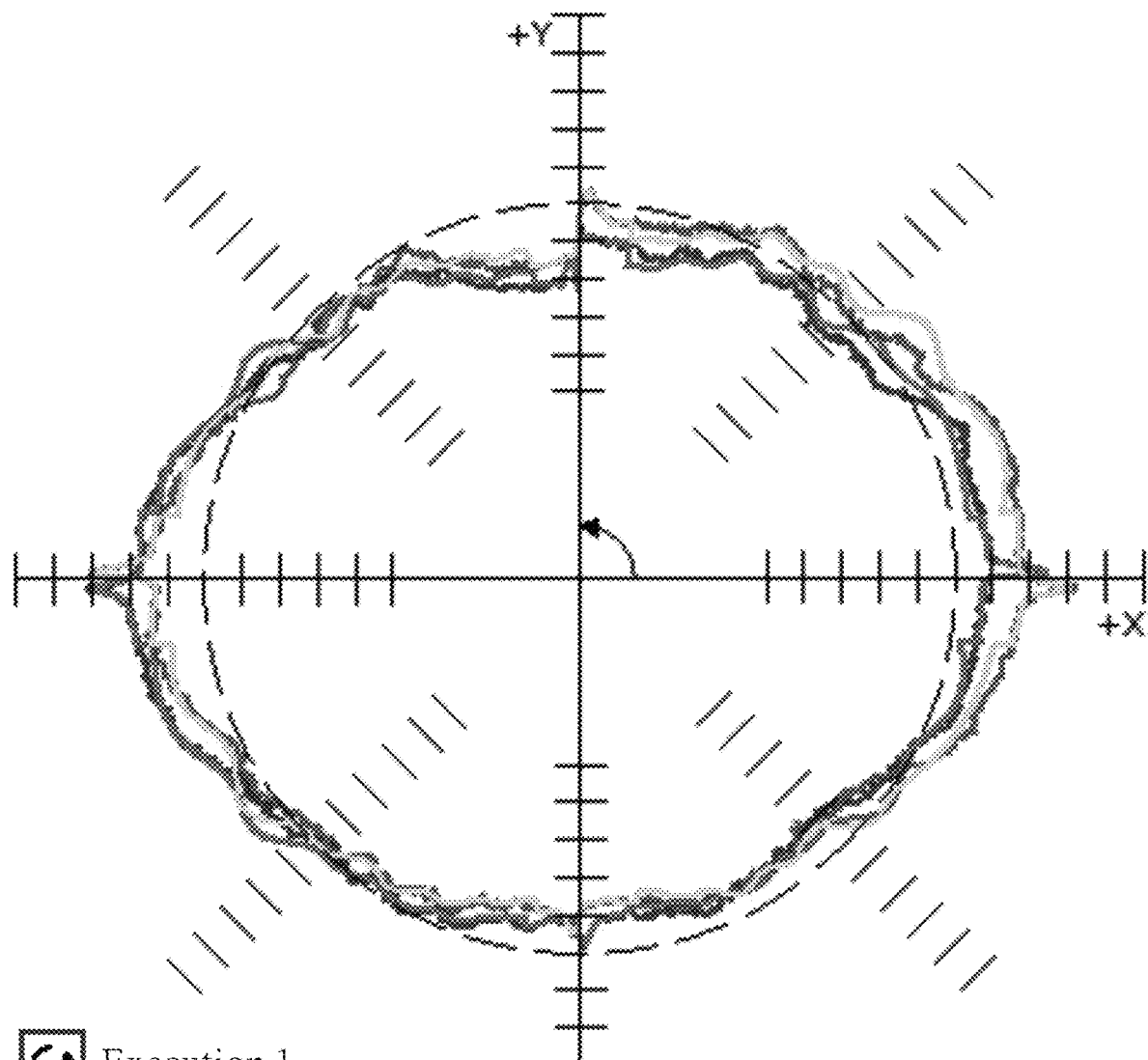
FIG. 4 is circularity test results after performing dynamic error compensation in a preferred embodiment of the invention.
Figure 5:
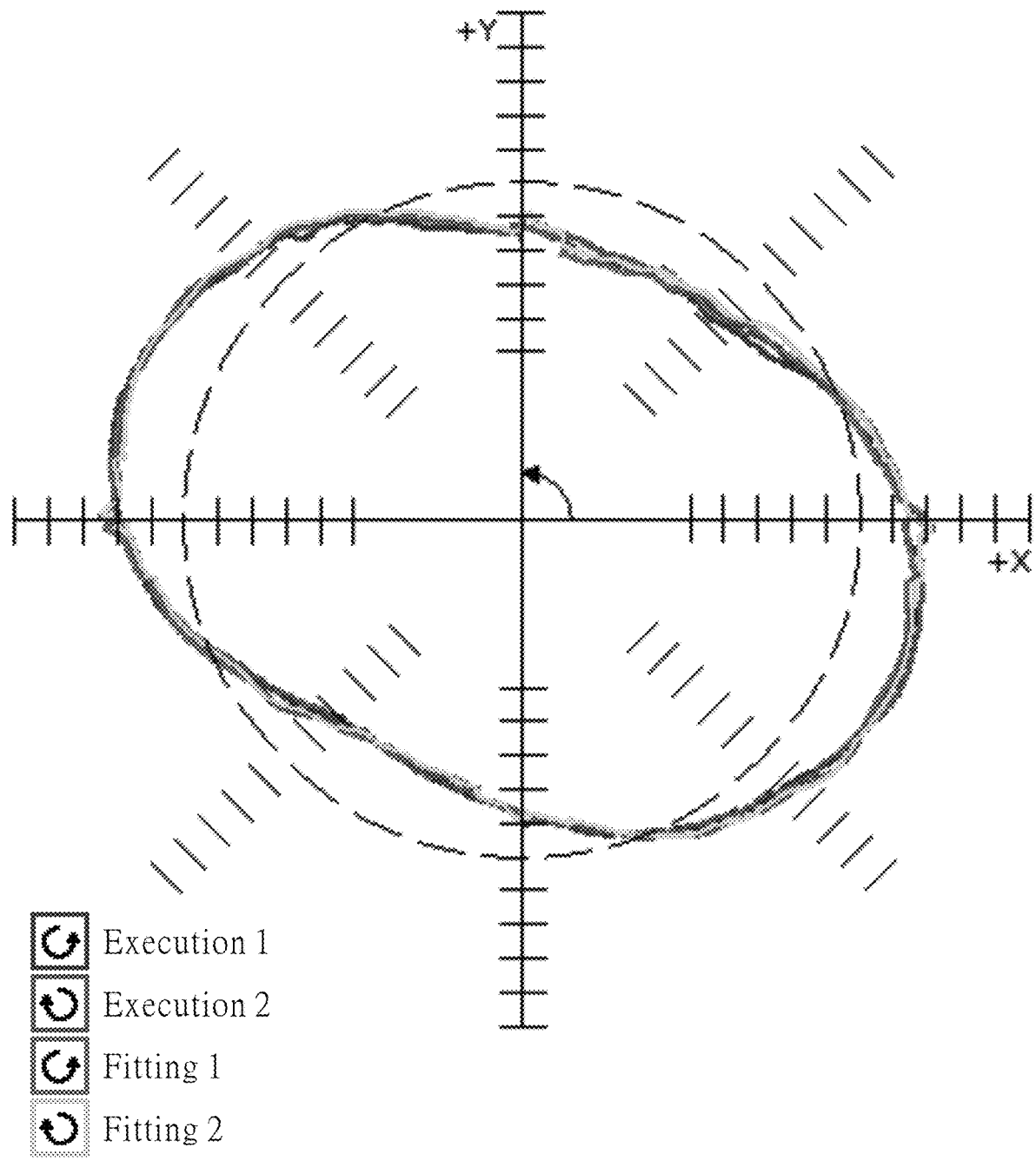
FIG. 5 is circularity test results of a control group of the invention without performing dynamic error compensation.

After performing the above-mentioned dynamic displacement error compensation, a circular degree of 11.0 μm is obtained from circularity test results shown in FIG. 4, compared to a circular degree of 23.5 μm obtained from uncompensated control circularity test results shown in FIG. 5, the invention is capable of achieving dynamic displacement error compensation and improving the precision of processing. In addition, the invention does not require additional compensation devices, dynamic displacement error compensation and precision of processing can still be achieved by only using the motor and the drivers, which has advantages in economic benefits and is applicable to dynamic position compensation of two axes or more than two axes, and compared with conventional single-axis compensation, compensation accuracy of the invention can also be substantially improved.

In addition, the applicant of the invention needs to provide further explanations. Although the first axis and the second axis are in a relative state of being perpendicular to each other in the above-mentioned embodiment, but they are not limited thereto, the first axis and the second axis can also be parallel to each other or in a state of perpendicularly intersecting with each other. Furthermore, the communication unit can be wireless transmission in addition to wired transmission. And, it is important that a source of the second dynamic positional information obtained by the first driver is not limited to the second driver, the position sensing mechanism can also enable both the first dynamic positional information and the second dynamic positional information to be fed back to the first driver and the second driver without being transmitted via the communication unit, which is also capable of achieving the objects and efficacies of the invention.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A dynamic displacement error compensation system comprising:

a first moving element moving linearly along a first axis and a first motor device for driving the first moving element;

a second moving element moving linearly along a second axis and a second motor device for driving the second moving element;

obtaining a detection error compensation table of the first moving element and the second moving element on the first axis and the second axis respectively;

characterized in that:

the detection error compensation table is provided with a first compensation table and a second compensation table, both of which use positional information of the first axis and positional information of the second axis as variables to obtain a compensation value on the first axis and a compensation value on the second axis respectively;

the first compensation table is stored in a first driver of the first motor device, and the first driver is provided with a first dynamic error processing unit;

the second compensation table is stored in a second driver of the second motor device, and the second driver is provided with a second dynamic error processing unit; and the first driver obtains a first dynamic positional information of the first moving element moving on the first axis and a second dynamic positional information of the second moving element moving on the second axis, the first dynamic error processing unit performs calculations according to the first compensation table to obtain a corresponding compensation value, and then compensates displacement of the first moving element on the first axis according to the compensation value;

the second driver obtains the first dynamic positional information and the second dynamic positional information, the second dynamic error processing unit performs calculations according to the second compensation table to obtain a corresponding compensation value, and then compensates displacement of the second moving element on the second axis according to the compensation value.

2. The dynamic displacement error compensation system as claimed in claim 1, wherein the first axis and the second axis are non-coaxial with each other.

3. The dynamic displacement error compensation system as claimed in claim 1, further comprising a communication unit electrically connected to the first driver and the second driver.

4. The dynamic displacement error compensation system as claimed in claim 3, wherein the first dynamic positional information is first transmitted to the first driver, and then transmitted from the first driver to the second driver via the communication unit; and the second dynamic positional information is first transmitted to the second driver, and then transmitted from the second driver to the first driver via the communication unit.

5. The dynamic displacement error compensation system as claimed in claim 4, wherein the communication unit transmits signals between the first driver and the second driver through a line.

* * * * *